E. K. BAKER.
DEMOUNTABLE RIM AND COMPLEMENTARY WHEEL.
APPLICATION FILED APR. 8, 1916.
1,310,048.
Patented July 15, 1919.
3 SHEETS—SHEET 1.
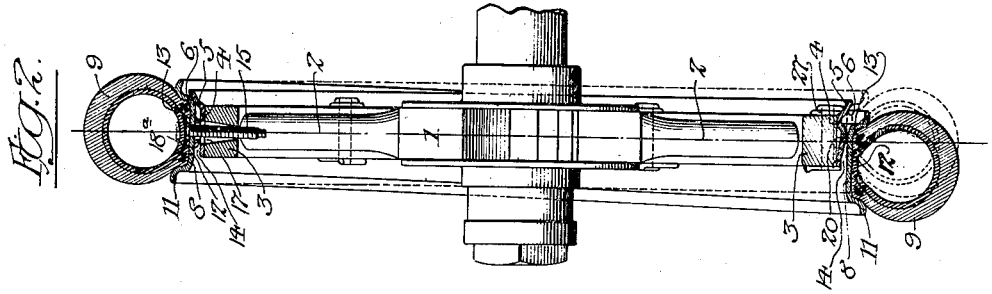
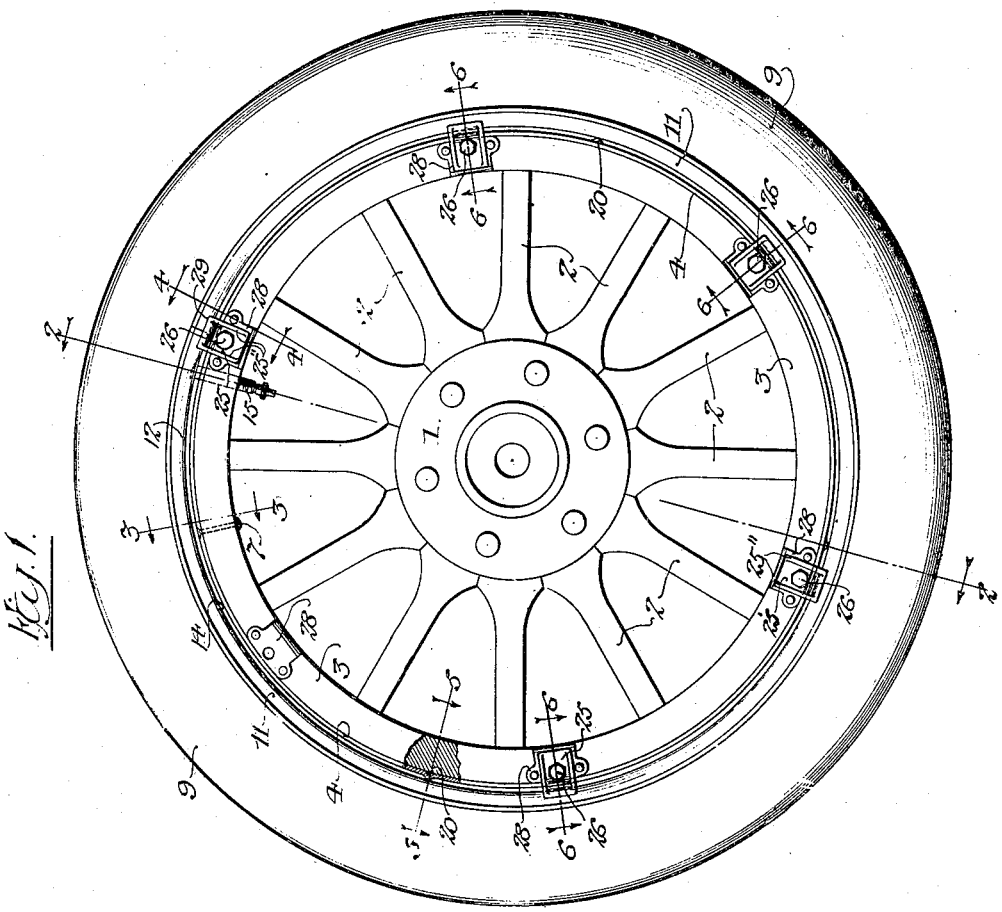

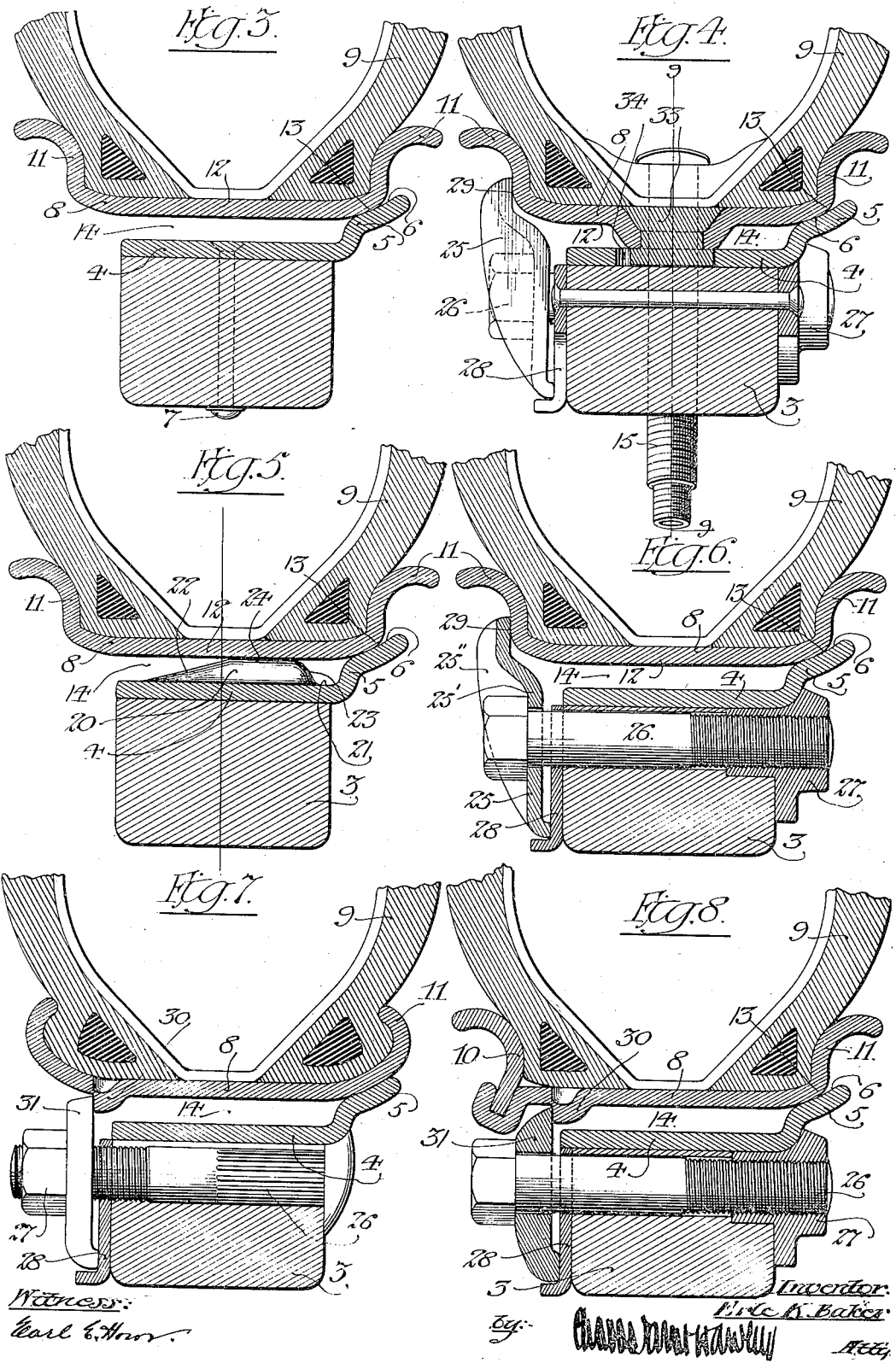

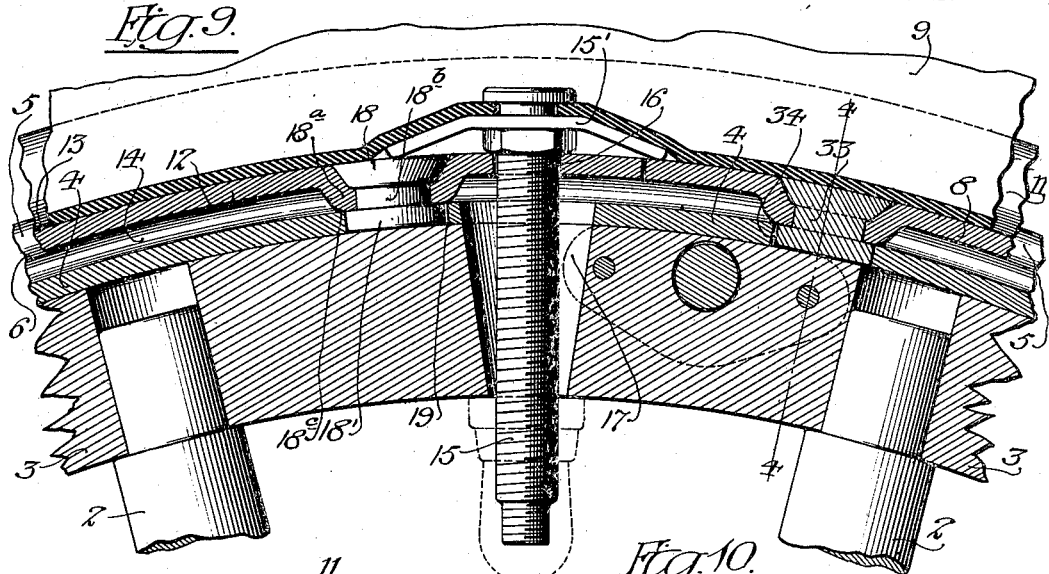
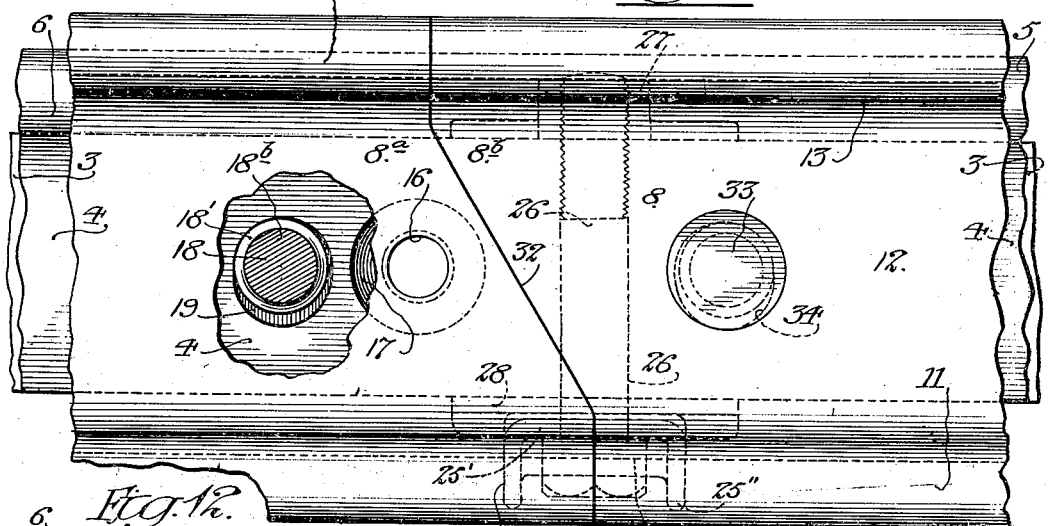
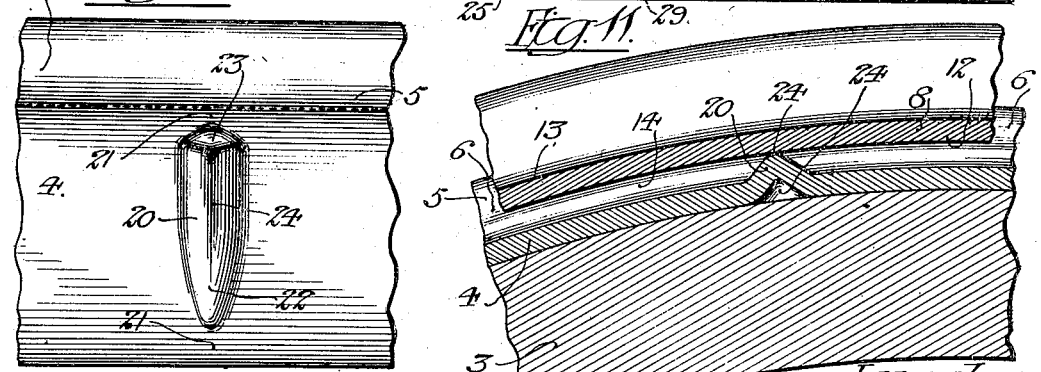

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM AND COMPLEMENTARY WHEEL.

1,310,048.   Specification of Letters Patent.   Patented July 15, 1919.

Application filed April 8, 1916. Serial No. 89,761.

*To all whom it may concern:*

Be it known that I, ERLE KING BAKER, a citizen of the United States, residing at Chicago, Cook county, Illinois, have invented certain new and useful Improvements in and for Demountable Rims and Complementary Wheels, of which the following is a specification.

My invention relates to demountable rim constructions for motor vehicle wheels which are equipped with tires that require changing from time to time.

It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The general objects of my invention will be made clear by the following statement of the problems and needs presented by the above defined practice.

The rim should be so made that it will be easy to attach and detach the tire, particularly in the case of tires having inextensible base beads. The rim must be capable of safely and securely holding the tire, both when in service on the wheel and when being carried as an inflated "spare." The rim and wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low. It is also extremely desirable that the construction shall be such that the rim may be mounted and demounted by the operation of few parts and in the least possible time.

For use with standard clencher tires which have base beads that may be stretched over its flanges, the rim may be of the integrally flanged endless type, and, to that extent, simpler than those required for tires having non-stretchable base beads. But in all other respects, the problem remains the same; for the matters of demountability, security, non-distortion, circularity, concentricity and perpendicularity are of equal importance as to all tires.

The specific object of my invention is to provide a rim demounting wheel construction which shall be applicable to rims and tires of all types and which shall provide the complete solution of all of the above stated problems.

The general nature and principles of my invention, and also the details of the best embodiment thereof that I have thus far devised, will be readily understood on reference to the drawings that form part of this specification; and are particularly pointed out in the appended claims.

In said drawings:—Figure 1 is an outer side elevation of a motor vehicle wheel and rim, embodying my invention; the same being equipped with a pneumatic tire;—Fig. 2 is a section on the line, 2—2, of Fig. 1, showing the rim in the act of being "buttoned-on" to the wheel;—Fig. 3 is a full sized cross section on the line, 3—3, of Fig. 1;—Fig. 4 is a like section on the line, 4—4, of Fig. 1;—Fig. 5 is a section on the line, 5—5, of Fig. 1;—Fig. 6 is a section on the line, 6—6, of Fig. 1;—Figs. 7 and 8 are cross sections, respectively showing clencher and straight-side rims, formed to coact with pressure or clutch lugs of another shape;—Fig. 9 is a section on the line, 9—9, of Fig. 4;—Fig. 10 is a plan view taken from Fig. 9, but omitting the tire and its valve stem;—Fig. 11 is an enlarged sectional detail of one of the concentering or guiding ribs on the fixed rim of the wheel; and Fig. 12 is a plan view thereof.

As shown in the drawings, 1, represents the wheel hub;—2 the radial spokes;—3 the wooden felly;—and, 4, the endless metal felly band or fixed rim, within which the felly and spokes are compressed. The fixed rim, 4, is provided with a raised back flange, 5, which overhangs the inner side of the felly and presents a substantially conical surface or rim seat, 6. The fixed rim may be secured on the felly in any suitable manner, as by radial rivets; one of which is shown by dotted lines, 7, in Figs. 1, and 3. The outer edge of the fixed rim is preferably flush with the outer face of the felly.

Throughout the drawings the demountable rim, whatever its specific kind, is marked 8; and, the tire, is marked 9. As will be clear from the several figures of the drawing, the demountable rim, 8, may be of either clencher cross section or straight-side cross section, according to the type of tire to be used therewith. A clencher section is shown in Fig. 7, and in that case the rim may be either endless or transplit. In Figs. 2 to 6, the rim is of the straight-side type having integral flanges, for use with straight-side tires; and, in consequence, the rim must be transplit. In Fig. 8 I have illustrated a straight-side endless rim of the circumferentially split type having a detachable side flange, 10, of well known form. I have here illustrated a variety of types of demountable rims in order that it may be clear that my invention is adaptable to all types.

Whatever its peculiar cross section, each rim is a relatively narrow, thin ring or cylinder having outwardly tire-retaining flanges upon its edges, as shown. I prefer that in every case the inner-side flange, 11, whatever its form, shall be integral with the cylindrical body portion, 12, of the rim. The junction, 13, of the flange, 11, and body, 12, is known, and hereinafter will be referred to, as the inside corner of the rim. This corner, 13, of the rim is circumferentially uniform and continuous, and, as shown in the sectional views, is complementary to the conical surface or seat, 6, on the raised back flange, 5. The rim, 8, is of greater circumference and diameter than the fixed rim, 4, and, as shown, there is an annular space, 14, between the rim, 8, and the fixed rim, 4. The back flange is positioned to receive and support the rim in concentric relation to the fixed rim, 4. In practice I make the space, 14, large enough to provide the necessary clearance between the rim 8, and fixed rim; to-wit, that amount of clearance which permits the rim to be buttoned on, and unbuttoned from the wheel; in the manner depicted in Fig. 2. I do not attempt to slide the rim, 8, axially upon the fixed rim. As best shown in Fig. 2, the back flange, 5, is of greater circumference than the body, 12, of the rim and therefore serves not only as a centering device but also acts as a positive stop, which prevents the pushing of the rim off the wheel in the direction of the body of the motor vehicle (not shown).

It will be understood that every pneumatic tire, 9, has a valve stem, 15, which passes through a valve stem hole, 16, in the rim, and extends radially toward the center of the rim. As shown in Fig. 2, the fixed rim, 4, and the felly, 3, contain a somewhat enlarged valve stem hole, 17. In mounting the rim and tire upon the wheel, the valve stem, 15, is placed in the hole, 17. Thus positioned, the valve stem serves as a temporary hinge between the rim and the wheel, enabling the rim to be swung thereon until the rim corner, 13, which is diametrically opposite the valve stem rests against the back-flange, 5. This operation of swinging the rim into position upon the wheel is known as the "buttoning-on" of the rim. The reverse operation is known as the "unbuttoning" of the rim. The annular space or clearance, 14, between the two rims should always be sufficient to allow this "buttoning" and "unbuttoning" of the rim to be accomplished without any great effort on the part of the user or operator.

When the rim is properly positioned with its corner, 13, in circumferential contact with the complementary conical surface 6, on the back flange, it is in condition to be secured in that position, and when so secured the assembled wheel, rim and tire are ready for use.

If, at the time of its concentric and perpendicular placement on the wheel, the two rims could be welded together along the corner, 13, then the rim would be ideally centered and fixed on the wheel; but, as such welding together of the parts would deprive the rim of its essential demountability, and is otherwise impractical, I have devised means by which the demountable and fixed rims may be firmly united along that line and yet remain readily separable.

I wish to call special attention to the fact that if it were practical to weld together the back flange and the rim, the rim would need no other support or fastening. Obviously, the pressure of the inflated pneumatic tire is distributed equally upon the rim which holds it, and the tire has no tendency to distort the rim. Adding to this, the fact that the cylindrical rim is sufficiently strong to sustain itself, it becomes obvious that a single circumferential support for one end of the cylindrical rim, i. e., for the inside corner, 13, thereof, is all that is required to hold the rim centrally on the wheel and prevent axial movement of the rim on the wheel. It is of course necessary that the said single line of support shall be expressed, or made tangible, in metal of sufficient thickness as to safely sustain the forces to which that connection is subjected.

The present invention is based on the foregoing conception and upon the discovery that a rim which is in any suitable manner forced and held upon the conical back flange, 5, needs no other support on the wheel; and every attempt to add to that support, as by the application of supporting means to the outer edge of the rim, results in the distortion of the rim in one direction or another, and in the loosening of the inside corner, 13, of the rim upon its supporting flange or seat. In other words, I find that the rim in itself is amply able to retain its shape with respect to the tire, and that from an operating standpoint, it is only necessary to fix the rim on the wheel along one circumferential line, as described. By limiting the engagement of the two rims to the single line at one end of the cylinder which composes the rim, and by positioning that line upon the conical back or stop flange, I have contrived an amply safe supporting and concentering connection, to which the rim may be buttoned and from which it may be readily disengaged. But the rim cannot be carelessly positioned on the conical back flange; for if it is, the rim more than often will be found eccentric, on the wheel and out of perpendicular with the axis thereof. The clearance, 14, between the rims, though desirable and necessary to the buttoning on of the rim, is very objectionable in that the demountable rim may assume a non-concentric position on the wheel. If the rim, 8, is fixed against the back flange when not concentric therewith, the tire and rim will take on a throwing and wabbling action when rotated, and as a consequence the tire will be prematurely worn out. As a first step in the correction of the fault due to the clearance space, 14, I provide the rim with an anti-creeping stud which properly spaces the two rims apart at a point adjacent the valve stem, 15; and, second, I provide the fixed rim with cross ribs or guides which perform a similar office at other points around the wheel and cause the rim to button on concentrically with the fixed rim, preparatory to being fastened upon the supporting flange, 5, thereof.

The driving stud just referred to is marked, 18, in Figs. 1, 4, 9 and 10. It is of such length that when the rim, 8, is placed on the wheel, the end, 18', of the stud sinks or fits into a hole, 19, in the felly band or fixed rim, 4 (see Figs. 9 and 10). The stud is preferably positioned midway between the edges of the rim and likewise in the middle plane of the wheel, and the parts are so proportioned that when the stud end, 18', is against the end of the slot or opening, 19, the corner, 13, of the rim, is found in proper position on the back flange, 5. That is, the stud forms a means of determining the lateral position of the rim upon the wheel, at points adjacent the valve stem, 15. In order that the stud may be readily entered in the hole, 19, I preferably transversely elongate the latter, as shown in Fig. 10. Such elongation makes it easier to "button on" the rim. The stud, 18, comprises two parts, to-wit, the pressed-down and perforated portion, 18$^a$, of the rim body, 12, plus the rivet, 18$^b$, of which, 18' is the shouldered end. The upsetting of the inner end of the rivet, 18$^b$, serves to fill the cavity or countersink within the portion, 18$^a$. I prefer that in every case the part, 18$^a$, shall be somewhat larger at its lower end than the part 18', whereby a shoulder, 18$^c$, is provided. This shoulder rests upon the face of the fixed rim, 4, and thus the driving stud constitutes the means by which the removable rim is properly spaced with respect to the fixed rim at points adjacent the valve stem hole therein.

The ribs or projections before referred to are marked 20 in Figs. 1, 2, 5, 11 and 12. As shown in Fig. 1, I prefer that there shall be three of these; one diametrically opposite to the valve stem hole, 17, in the wheel, and the other two at the quarters with respect thereto. These projections are preferably pressed up from the metal forming the fixed rim, 4, and are substantially V-shaped ribs which extend transversely across the fixed rim and present relatively narrow tops or edges to the inner periphery of the demountable rim, as best shown in Figs. 5, 11 and 12. Each rib rises adjacent the outer edge of the fixed rim and extends nearly to the back flange, 5, thereon; flat spaces, 21, remaining at their ends. The ends, 22, of the ribs are preferably inclined or sloped as shown in Fig. 5, to avoid presenting sharp corners to the rim, 8, when being swung or buttoned on the wheel. The ends, 23, of the ribs, 20, are more abrupt. The outer ends, 22 are so inclined that the level top or edge, 24, of the rib, is not reached until the middle plane of the wheel is passed. The special form herein shown is much to be preferred over ribs of greater transverse extent. The latter are possible, but make it somewhat more difficult to button and unbutton the rim.

As best shown in Figs. 5 and 11, I prefer that each of the V-shaped guiding ribs or projections shall be as high as permitted by the uniform clearance-space, 14. They should not be higher, and need not be lower. It is desirable that they shall at least lightly contact the inner periphery of the rim at points closely adjacent the back flange, and thus positively insure the concentricity of the wheel and rim, by guiding the rim to its final concentric seat on the flange, 5.

When the rim, 8, has been hinged on the wheel by the engagement of its valve stem and driving stud, 18, in the holes of the wheel, the part of the rim opposite the valve stem may be swung into place. At that time the ribs, 20, being back of the middle plane of the wheel and rim do not interfere with the swinging on of the rim, but nevertheless provide centering supports for the rim as soon as its circumferential corner, 13, approaches the seat, 6, on the back flange, 5. With transverse guiding or concentering projections such as these, the rim is not engaged until it has passed nearly into contact with the back flange. Hence it is unnecessary to use special force in buttoning the rim into place; and yet, as explained, the rim is positively centered with respect to the back flange cone which is to support it.

To those who are skilled in the art, it will at once be apparent that while the three projections, 20, shown in Fig. 1, are usually sufficient, the number thereof may be increased to any extent desired without making it more difficult to button and unbutton the rim. Indeed, I recommend such an increase when rims that are not substantially circular must be used. As well shown herein, the rim is compelled to assume a concentric, and hence circular and perpendicular position on the wheel, even though the rim is initially much out of round. In this connection I wish to call special attention to the fact that my invention entirely overcomes the above noted objectionable characteristics of the clearance space between the rims, for it is no longer possible for the rim to become eccentric on the wheel.

It will now be understood that my novel construction provides an effective uniform conical support for the rim and also effective means for placing or positioning the rim concentrically and perpendicularly on the wheel. It only remains to fasten the rim in that position. This I accomplish by the use of simple axial pressure lugs, or a ring; and without danger of disturbing the bearing of the corner, 13, of the rim on its seat, 6; and, without distorting the rim in any manner whatever; that is, without throwing the rim out of round. Such objectionable distortion is observed in all rims which are clamped by devices thrusting them radially away from the wheel body at circumferentially spaced points and it is that sort of distortion which causes tires to wear unevenly; one of the particular bad effects that I obviate by my invention.

Most conveniently, I employ a number of pressure plates or lugs, 25, circumferentially spaced around the felly of the wheel and clamped thereto by respective bolts, 26. As shown by a comparison of Figs. 6 and 7, the bolt may have a head upon its outer end and a nut, 27, on the inner side of the felly, or the head of the bolt may be on the back of the wheel and the pressure plate may be secured by a nut on the outer end of the bolt. I prefer in ordinary practice to use the headed bolts threaded in the nuts, 27, as they are less apt to become loose. The inner ends of the pressure lugs bear against washers, 28, on the outer side of the felly. The outer ends of the pressure lugs are preferably flat, and hence present plane pressure surfaces, 29, to the outer flange of the rim, as shown in Fig. 4. The lug, 25, is stamped from sheet metal and is further characterized by the pressed-in portion, 25', and the raised edge flanges, 25''. Though of little weight this pressed steel lug is extremely strong and absolutely rigid and inflexible. As an alternative construction, a part, 30, of the rim may be struck down to provide a lug for engagement by a pressure lug, 31, of more simple form, as shown in Figs. 7 and 8.

After the rim is positioned on the wheel, the pressure lugs are placed on the bolts and are thereby clamped firmly against the rim. In this manner, the corner, 13, of the rim is pressed firmly upon the back flange, 5, of the fixed rim, and from that moment, the demountable rim, 8, becomes as though a rigid part of the fixed rim, 4.

As before stated, the cylindrical demountable rim is self-sustaining under the pressure of an inflated pneumatic tire. And likewise it is self-sustaining as to its outer edge, once its inner edge is seated on the back flange of the wheel. The pressure lugs act against the outer side flange of the rim in lines which are parallel with the axis of the wheel. They at no time tend to either force the rim radially inward, or radially outward, with respect to the wheel. If any such radial movement were effected, the rim would be correspondingly distorted out of its true or normal circular condition; and the rim would be loosened on its supporting seat, 6, and rapid wear would result from the lost motion or looseness between the parts.

In practice, I prefer to place one of the pressure or clamping lugs adjacent to the valve stem, 15, and as shown in Figs. 1, 4, 9 and 10, the other lugs are spaced with respect thereto. I find that three pressure lugs are in fact sufficient for the purpose, but in order that the structure may appear to be amply strong, I prefer to use five or more of them. Strictly speaking, their number depends on the pitch of the conical seat, 6. I have not deemed it necessary to specially illustrate a pressure ring to be substituted for the separate pressure lugs, as the form of such a ring is made obvious in Figs. 4 and 6.

Every integrally-flanged, one-piece demountable rim which is to be used with a tire having inextensible base beads, must be transversely split or cut at one point in its circumference, and in this connection I wish it understood that my present invention may be carried out with integrally flanged transplit rims of the kind illustrated in my earlier Patent, No. 1,095,775, and the like. But somewhat better results are secured, and the cost is lessened, by constructing the rim in accordance with the disclosure herein. The employment of my invention with endless rims is clearly depicted in the cross-sectional views of the drawings; and in Figs. 9 and 10 I have shown the features which are added in the case of a transplit rim. As shown in Fig. 10, the "transplit" or cross-cut is represented by the relatively diagonal line, 32. The particular form of the cut herein shown is not claimed in this application, but is both described and claimed in my companion application filed April 3, 1916, to-wit, Serial No. 88,668, patented Oct. 23, 1917, No. 1,244,014. A transverse cut of the kind depicted causes the rim ends, 8ª, and 8ᵇ, to be self-alining and self-holding under the pressure of an inflated "spare" tire, and also permits the easy lateral separation of the rim ends as required in attaching and detaching the rim from the tire. I prefer that the transplit cut, 32, shall be located closely adjacent to the valve stem hole, 16, in the rim, 8, to the end that the valve stem spreader, 15′, may cover the part of the split which would otherwise not be exposed within the tire. (See also Fig. 4).

The rim end, 8ª, is provided with the driving stud, 18, as before described, and to secure the other rim end, 8ᵇ, I provide it with a like driving stud, 33, and make a corresponding hole, 34, in the fixed rim, to receive it. In this case the driving studs, 18 and 33, acting in conjunction with the engaged, intervening portion of the fixed rim, 4, serve to positively and non-adjustably, but detachably, secure the rim ends together, when the rim is positioned on the wheel. This being the case, it is clear that the rim ends cannot become detached from the wheel or forced away from the fixed rim when the pressure lugs, 25, are tightened. Thus constructed, a transplit demountable rim acts in the same way as a non-split or endless rim, once it is positioned on the wheel.

The extreme simplicity and low cost of the described construction will be apparent to all who are skilled in the art; and generally it will be apparent that by means of the described structure, I attain all the primary objects, and fulfil all of the requirements, set forth in the opening paragraphs of this specification.

While I have illustrated and described my invention in accordance with the patent statutes, I desire it to be understood that the details of construction may be materially varied, and that many changes, modifications, and substitutions may be made in the structure herein illustrated, without departing from the spirit and scope of my invention as set forth in the appended claims.

Having thus described my invention, I claim as new and desire to secure by Letters Patent:—

1. A motor vehicle wheel having a fixed rim provided with a substantially conical back flange, in combination with a demountable, tire-carrying, flanged rim, of enough greater circumference to allow it to be buttoned on to the fixed rim, and having an inner circumferential corner in substantially single-line conical contact with said back flange, an anti-creeping device connecting the fixed and demountable rims, a plurality of pressure lugs contacting only the outer side flange of the demountable rim, and bolts in the wheel for tightening said lugs axially against said outer side flange; whereby the demountable rim is fixedly sustained only by said back flange of the fixed rim, substantially as and for the purposes specified.

2. A motor vehicle wheel having a fixed rim provided with a substantially conical back flange, in combination with a demountable, tire-carrying, flanged rim, of enough greater circumference to allow it to be buttoned on to the fixed rim, and having an inner circumferential corner in substantially single-line conical contact with said back flange, an anti-creeping device connecting the fixed and demountable rims, a plurality of pressure lugs contacting the demountable rim in condition only for axial movement thereof, and bolts in the wheel for tightening said lugs axially against the demountable rim; whereby the demountable rim is fixedly sustained only by said back flange of the fixed rim, substantially as and for the purpose specified.

3. A motor vehicle wheel having a fixed rim provided with a substantially conical back flange, in combination with a demountable, tire-carrying, flanged rim, of enough greater circumference to allow it to be buttoned on to the fixed rim, and having an inner circumferential corner in substantially single-line conical contact with said back flange, an anti-creeping device connecting the fixed and demountable rims, a plurality of pressure lugs contacting the demountable rim in condition only for axial movement thereof, and bolts in the wheel for tightening said lugs axially against the demountable rim; whereby the demountable rim is fixedly sustained only by said back flange of the fixed rim, and means for centering the demountable rim on the wheel, substantially as and for the purpose specified.

In testimony whereof I have hereunto set my hand this 1st day of April, 1916.

ERLE KING BAKER.